US010963483B2

United States Patent
Radebaugh et al.

(10) Patent No.: US 10,963,483 B2
(45) Date of Patent: Mar. 30, 2021

(54) SEQUENTIAL STORAGE VOLUME REPLICATION BASED ON COMPARISON OF WRITE SESSION IDENTIFIERS

(71) Applicant: Oracle International Corporation, Redwood Shores, CA (US)

(72) Inventors: Keith Radebaugh, Thornton, CO (US); Damon Clark, Niwot, CO (US); Keith Noe, Westminster, CO (US)

(73) Assignee: Oracle International Corporation, Redwood Shores (CA)

( * ) Notice: Subject to any disclaimer, the term of this patent is extended or adjusted under 35 U.S.C. 154(b) by 497 days.

(21) Appl. No.: 15/498,380

(22) Filed: Apr. 26, 2017

(65) Prior Publication Data

US 2018/0314747 A1    Nov. 1, 2018

(51) Int. Cl.
*G06F 16/00* (2019.01)
*G06F 16/27* (2019.01)
*G06F 16/178* (2019.01)

(52) U.S. Cl.
CPC ............ *G06F 16/27* (2019.01); *G06F 16/178* (2019.01)

(58) Field of Classification Search
CPC ...... G06F 16/27; G06F 16/137; G06F 16/178; G06F 16/1844; G06F 16/2237; G06F 16/2246; G06F 16/2365; G06F 16/24558; G06F 16/90344
USPC ........................................................ 707/624
See application file for complete search history.

(56) References Cited

U.S. PATENT DOCUMENTS

| 7,243,108 | B1* | 7/2007 | Jas | G06F 16/211 707/999.101 |
|---|---|---|---|---|
| 8,484,236 | B1* | 7/2013 | Andrews | G06F 16/90344 707/763 |
| 8,595,595 | B1* | 11/2013 | Greanac | G06F 11/1088 714/770 |
| 8,843,517 | B1* | 9/2014 | Koo | G06F 3/0689 707/770 |
| 10,824,596 | B2* | 11/2020 | Mueller | G06F 16/221 |
| 2002/0059260 | A1* | 5/2002 | Jas | G06F 16/2365 707/999.1 |
| 2006/0059173 | A1* | 3/2006 | Hirsch | G06F 11/1453 707/999.1 |
| 2006/0059207 | A1* | 3/2006 | Hirsch | G06F 11/1453 707/999.201 |
| 2006/0107159 | A1* | 5/2006 | Krasilinec | G06F 11/0778 714/742 |

(Continued)

*Primary Examiner* — Ashish Thomas
*Assistant Examiner* — Rezwanul Mahmood
(74) *Attorney, Agent, or Firm* — Invoke (57) ABSTRACT

Described herein are systems and methods for replicating an original sequential data volume to a copied sequential data volume. The two sequential data volumes comprise corresponding data blocks with associated write session identifiers. The write session identifiers may correspond to an applicable write operation. When the original sequential data volume is modified, the copied sequential data volume may also be modified for consistency. The write session identifiers of the two data volumes may be sequentially compared to find a mismatch at a modified data block. The data blocks of the copied sequential data volume are replaced, beginning with the modified data block. Instead of replicating the entire original sequential data volume, the modified data block and any subsequent data blocks are replicated in the copied sequential data volume.

21 Claims, 6 Drawing Sheets

(56) References Cited

U.S. PATENT DOCUMENTS

| | | | |
|---|---|---|---|
| 2006/0112264 A1* | 5/2006 | Agarwal | H03M 7/30 713/150 |
| 2006/0200497 A1* | 9/2006 | Hu | G06F 11/1471 707/999.2 |
| 2007/0033331 A1* | 2/2007 | Sinclair | G06F 12/0246 711/103 |
| 2007/0033332 A1* | 2/2007 | Sinclair | G06F 12/0246 711/103 |
| 2007/0198550 A1* | 8/2007 | Irving | G06F 16/16 707/999.1 |
| 2008/0062775 A1* | 3/2008 | Oh | H03M 7/30 365/189.05 |
| 2010/0067701 A1* | 3/2010 | Patwari | H04L 9/0875 380/279 |
| 2010/0169972 A1* | 7/2010 | Kuo | G06F 21/564 726/23 |
| 2011/0258374 A1* | 10/2011 | Pertocelli | G06F 16/174 711/104 |
| 2011/0280397 A1* | 11/2011 | Patwar | H04L 9/0875 380/44 |
| 2013/0060696 A1* | 3/2013 | Martin | G06Q 40/00 705/44 |
| 2013/0124534 A1* | 5/2013 | Dinh | G06F 16/338 707/748 |
| 2013/0275394 A1* | 10/2013 | Watanabe | G06F 16/215 707/692 |
| 2014/0114951 A1* | 4/2014 | Sasaki | G06F 11/3452 707/715 |
| 2014/0136759 A1* | 5/2014 | Sprouse | G11C 11/5642 711/103 |
| 2014/0136762 A1* | 5/2014 | Li | G11C 11/5642 711/103 |
| 2014/0195759 A1* | 7/2014 | Gantman | G06F 3/0608 711/165 |
| 2015/0142819 A1* | 5/2015 | Florendo | G06F 16/22 707/741 |
| 2015/0143063 A1* | 5/2015 | Mutalik | G06F 11/1451 711/162 |
| 2015/0178305 A1* | 6/2015 | Mueller | G06F 16/221 707/693 |
| 2016/0344810 A1* | 11/2016 | Das | G06F 3/0647 |
| 2016/0378844 A1* | 12/2016 | Karve | G06F 16/2365 707/620 |
| 2017/0131934 A1* | 5/2017 | Kaczmarczyk | G06F 3/0641 |
| 2018/0314747 A1* | 11/2018 | Radebaugh | G06F 16/27 |

* cited by examiner

SEQUENTIAL STORAGE VOLUME REPLICATION BASED ON COMPARISON OF WRITE SESSION IDENTIFIERS

TECHNICAL FIELD

The present disclosure relates to a system and method to replicate a sequential storage volume using a comparison of write session identifiers.

BACKGROUND

In order to protect tape data from technical failures, natural disasters and other catastrophic failures, users rely on making multiple copies of the data. The initial version of the data may be referred to herein as the "original version" of the data or the "original data set". A copy of the data generated, from the original version of the data, may be referred to herein as the "copy version" of the data, or the "copied data set". After the copied data set has been generated from the original data set, the user may modify the original data set. The copied data set may then need to be updated similarly. If only a portion of the original data set is modified, only the corresponding portion of the copied data set needs an update. However, some copying mechanisms copy the entire contents of the original data set to the copied data set as it is often unknown which portions of the original data set differ from the copied data set.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 3A-FIG. 3C illustrate an example for replicating an original sequential data set into a copied sequential data set, in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring of the present invention.

TABLE OF CONTENTS

1. GENERAL OVERVIEW
2. DATA REPLICATION SYSTEM ARCHITECTURE
3. DATA REPLICATION PROTOCOL
4. REPLICATION EXAMPLE
5. HARDWARE OVERVIEW
6. MISCELLANEOUS; EXTENSIONS

1. General Overview

An original sequential data volume (also referred to herein as an "original sequential data set") is replicated to a copied sequential data volume (also referred to herein as a "copied sequential data set"). In one or more embodiments, the two sequential data volumes comprise corresponding data blocks. When the original sequential data volume is modified, the copied sequential data volume must also be updated. Copying data from the original sequential data volume to the copied sequential data volume may begin at a particular data block partly through the original sequential data volume, rather than a first data block of the original sequential data volume. Instead of replicating the entire original sequential data volume, the particular data block and the following data blocks are replicated to the copied sequential data volume.

In one or more embodiments, a write session identifier associated with each data block is used to identify the particular data block from which data blocks in the original sequential data volume are to be replicated to the copied sequential data volume. A replication system compares the write session identifiers of corresponding data blocks in the original sequential data volume and the copied sequential data volume. The replication system, via the comparison operation, identifies a first mismatch between the write session identifiers of corresponding data blocks of the original sequential data volume and the copied sequential data volume. When the first mismatch is found between the write session identifiers of corresponding data blocks, the system replicates the particular data block associated with the first mismatched write session identifiers from the original sequential data volume to the copied sequential data volume. The system further replicates any data blocks following the particular data block from the original sequential data volume to the copied sequential data volume. As a result of the replication, the data blocks of the copied sequential data volume are updated, beginning with the data block corresponding to the mismatched write session identifier. Data blocks prior to the data block corresponding to the mismatched write session identifier need not be updated.

2. Data Replication System Architecture

Figure 1:
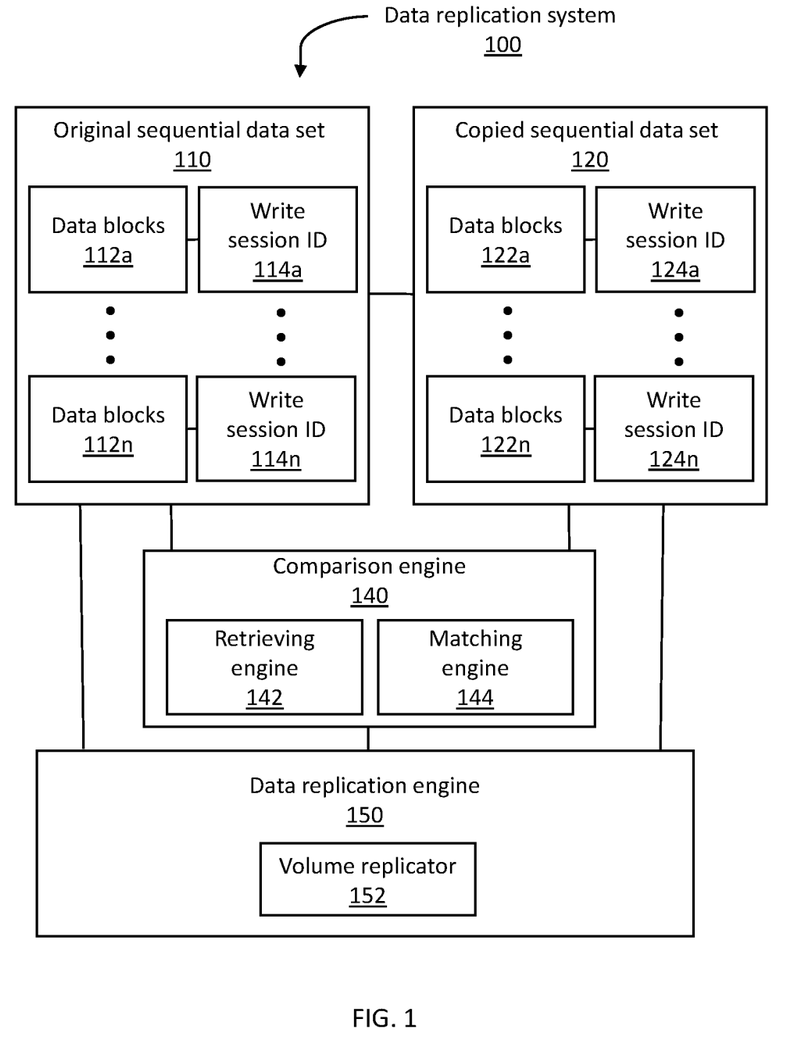
FIG. 1 illustrates an example data replication system, in accordance with one or more embodiments.

FIG. 1 illustrates an example data replication system 100 including an original sequential data set 110, a copied sequential data set 120, a comparison engine 140, and a data replication engine 150. In one or more embodiments, data replication system 100 may include more or fewer components than the components illustrated in FIG. 1. The components illustrated in FIG. 1 may be local to or remote from each other. The components illustrated in FIG. 1 may be implemented in software and/or hardware. The components may be distributed over multiple applications and/or machines. Multiple components may be combined into one application and/or machine. Operations described with respect to one component may instead be performed by another component.

In one or more embodiments, original sequential data set 110 and copied sequential data set 120 are data sets associated with the data replication system 100. In a sequential data set, a data block is written, and the following data blocks are also written or erased. The data may only be written sequentially. Thus, if a data block in the middle of the data set is modified, the data following the modification is erased. A sequential data set may correspond to a tape volume, a video stream, or any sequentially written data.

In one or more embodiments, a sequential data set (e.g., original sequential data set 110, and copied sequential data set 120) may be accessible via data communications networks, such as a storage area network (SAN), local area network (LAN), wide area network (WAN) or the Internet. A sequential data set may be transmitted using one or more network protocols such as protocols within the IP suite. In other embodiments, the sequential data sets 110, 120 may reside on the same host machine. The sequential data sets 110, 120 may be transmitted using APIs, calls, inter-tier messages, or any other interface that allows different tiers to communicate. The protocols and interfaces used to transmit data between the sequential data sets 110, 120 may vary from implementation to implementation.

As illustrated, original sequential data set 110 may include one or more data blocks 112a-112n associated with corresponding write session identifiers 114a-114n. Additionally, copied sequential data set 120 may include one or more data blocks 122a-122n associated with corresponding write session identifiers 124a-124n. The copied sequential data set 120 replicates the original sequential data set 110, as described in more detail herein.

A data block corresponds to a specific number of bytes of physical space on a memory device, such as a disk or tape. The data block sizes may be a multiple of the operating system's block size within the maximum limit to avoid unnecessary I/O. For instance, a data block size may be 1 KB.

In one or more embodiments, the data block includes overhead and data. The overhead may include one or more headers. In one or more embodiments, the header may include general block information, such as the block address, the type of segment, and/or the associated write session identifier. Additionally, or alternatively, the write session identifier may be stored as metadata associated with the data block. The data block overhead total size may vary, for example, between 84 to 107 bytes. In one or more embodiments, storage for each write session ID may use 1 to n bytes. Therefore, a minimum number of bytes may be transmitted and/or compared as described herein with respect to the data replication protocol of FIG. 2.

In one or more embodiments, each of the data blocks in the sequential data set may be written to separately. When writing, the data blocks will be written contiguously in a single direction from a starting data block to an end data block. Thus, each data block following the starting data block will be overwritten.

In one or more embodiments, a write session identifier (e.g., write session identifiers 114a-114n, 124a-124n) may be assigned to a corresponding data block (e.g., data blocks 112a-112n, 122a-122n) of a sequential data set (e.g., sequential data sets 110, 120). In one or more embodiments, the write session identifier (referred to herein as a "write session ID") may be used to uniquely identify each write session operation. The write session operation may comprise a single sequential write operation where data is written to one or more data blocks. Contiguous data blocks will be written beginning from a starting data block to an end data block. When a data block of a sequential data set is modified, the modified data block and all data blocks subsequent to the modified data block will be updated with a new write session identifier. A write session identifier of an end data block may be associated with a latest or most current write session identifier, unless the end block is a tape mark (e.g., contains no data).

A data block may be overwritten any number of times. Each time one of the data blocks is overwritten by a write session operation, the write session ID is amended according to the specific write session operation. When one of the data blocks 112a-112n is overwritten, or changed, the data replication system 100 may amend a corresponding data block 122a-122n in the copied sequential data set 120. A detailed example of this replication is illustrated and described with respect to FIGS. 3A-3C.

The write session may include at least two or three separate pieces of data. The write session may include a unique identification (UID), a session ID, and a session modifier. The UID is established when the first block of the sequential data set is written. The UID is unique for all sequential data sets in the system. The session ID corresponds to a start of a new write session. The session modifier indicates when a copied sequential data set is modified by a source other than a replication.

In one or more embodiments, the UID may comprise a timestamp or another unique identifier. The session ID may include a count of read to write transitions on the original sequential data set 110.

In one or more embodiments, the comparison engine 140 comprises a retrieving engine 142 and a matching engine 144. In one or more embodiments, the comparison engine 140 retrieves and compares the write session identifiers 114a-114n with the write session identifiers 124a-124n. The data blocks 112a-112n in original sequential data set 110 may respectively correspond to the data blocks 122a-122n in the copied sequential data set 120.

In one or more embodiments, the retrieving engine 142 may include functionality to retrieve write session identifiers for comparison. In one or more embodiments, the write session identifier of each data block in each sequential data set is retrieved from the header of the data block without retrieving the data in the data block. Further, the retrieving engine 142 may also be configured to verify the data integrity of the write session ID.

In one or more embodiments, the matching engine 144 may determine whether the write session ID 114a-114n of the data blocks 112a-112n matches the write session ID 124a-124n of a respective data block in the data blocks 122a-122n. For example, the matching engine 144 may determine that the write session identifier of a particular data block of the data blocks 112a-112n does not match a write session identifier of a corresponding data block of the data blocks 122a-122n. Additionally or alternatively, the retrieving engine 142 may cease retrieving write session identifiers from each sequential data set upon determination of a first mismatched write session identifier.

In one or more embodiments, the data replication engine 150 may copy all or only a part of the original sequential data set 110 to the copied sequential data set 120. In one or more embodiments, the data replication engine 150 may retrieve the modified data blocks from the original sequential data set 110.

In one or more embodiments, the data replication engine 150 comprises a volume replicator 152. The volume replicator 152 may replicate the modified data blocks of the original sequential data set 110 to the corresponding data blocks of the copied sequential data set 120. The volume replicator 152 may be activated by the matching engine 144. For example, the matching engine 144 may identify mismatched write session identifiers in a particular data block of original sequential data set 110 and the corresponding data block in the copied sequential data set 120. The matching engine 144 may transmit a message, to the volume replicator 152, which identifies the particular data block with the mismatched write session identifiers. The volume replicator 152 may copy the particular data block of the original sequential data set 110 to the copied sequential data set 120. Additionally, or alternatively, the volume replicator 152 will copy any data block subsequent to the particular data block in the original sequential data set 110, to corresponding data blocks in the copied sequential data set 120.

In one or more embodiments, the copied sequential data set 120 is a replication of the original sequential data set 110. The copied sequential data set 120 may be modified at an independently selected time that is unrelated to the time at which the original sequential data set 110 was modified. Furthermore, the copied sequential data set 120 may be modified by a different application or process than the application or process that modified the original sequential data set 110. A session modifier associated with sequential data set 120 will identify that the copied sequential data set 120 has been modified. The session modifier may be represented by a single bit that is stored as meta-data for the copied sequential data set 120.

3. Data Replication Protocol

Figure 2:
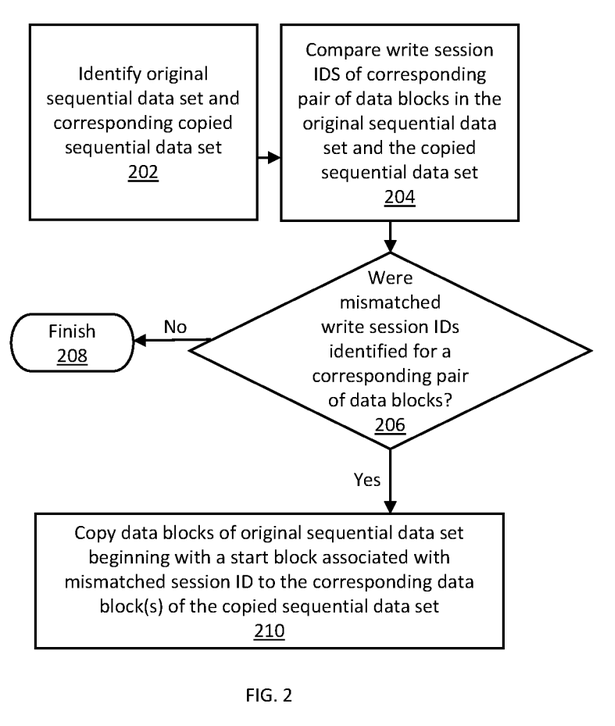
FIG. 2 illustrates an example set of operations for implementing a data replication system for replicating a sequential data set, in accordance with one or more embodiments.

In one or more embodiments, the data replication system is configured to replicate any modifications in the original sequential data set to the copied sequential data set according to a data replication protocol. FIG. 2 illustrates an example set of operations for implementing the data replication protocol, in accordance with one or more embodiments.

The data replication protocol may be immediately initiated upon an update to an original sequential data set, or may be initiated at a later time based on a set of rules. The data replication protocol may be initiated periodically or upon detection of a triggering event. In one or more embodiments, the triggering event may include a policy-based trigger. The triggering event may include detecting that access to an original sequential data set has been terminated following the detection of access to the original sequential data set. The triggering event may include detecting that a tape drive has finished a writing session. The triggering event may include detecting that a tape drive corresponding to the original sequential data set was unloaded. The triggering event may include detection of a particular signal corresponding to a data replication request or data synchronization request.

In one or more embodiments, upon initiation of the data replication protocol, an original sequential data set and a corresponding copied sequential data set may be identified (Operation 202). For example, the data replication system may traverse a table to identify a copied sequential data set that corresponds to an original sequential data set. Furthermore, the table may be traversed to identify which data blocks of the original sequential data set correspond to which respective data blocks of the copied sequential data set.

One or more embodiments include comparing write session identifiers of a pair of corresponding data blocks in the original sequential data set and the copied sequential data set (Operation 204). The comparison operation includes executing comparison operations until a sequentially-first corresponding pair of data blocks, from the original sequential data set and the copied sequential data set, with mismatched write session identifiers has been determined.

A matching engine may use a binary search algorithm to select a corresponding pair of data blocks for comparison of the write session identifiers associated with the selected corresponding pair of data blocks. If the write session identifiers of a corresponding pair of data blocks match, then another corresponding pair of data blocks subsequent to the matching pair of data blocks is selected for write session ID comparison. If the write session identifiers of a corresponding pair of data blocks do not match, then another corresponding pair of data blocks prior to the non-matching corresponding pair of data blocks is selected for write session ID comparison. The process is repeated until a sequentially-first corresponding pair of data blocks without matching write session identifiers is determined. The data block, of the original sequential data set, in the sequentially-first corresponding pair of data blocks without matching write session identifiers may be a first modification point of the original sequential data set since the last execution of the data replication process.

In an embodiment, the matching engine determines whether any mismatch between the write session identifiers of a corresponding pair of data blocks in the original sequential data set and the copied sequential data set have been identified (Operation 206). If no mismatched write session identifiers for a corresponding pair of data blocks is found, then the data replication process is finished (Operation 208).

If mismatched write session identifiers for a corresponding pair of data blocks is found, then one or more data blocks from the original sequential data set must be replicated to the copied sequential data set. As described above in relation to Operation 204, the comparison of write session identifiers includes identifying a sequentially-first corresponding pair of data blocks with mismatched write session identifiers. In an embodiment, the copying of data blocks from the original sequential data set to the copied sequential data set begins from this sequentially-first corresponding pair of data blocks with mismatched write session identifiers (Operation 210). Furthermore, all data blocks, subsequent to the sequentially-first corresponding pair of data blocks with mismatched write session identifiers, are synchronized. Synchronizing data blocks includes ensuring that a data block in the copied sequential data set is updated or confirmed to match the corresponding data block in the original sequential data set. Synchronizing data blocks subsequent to the sequentially-first corresponding pair of data blocks with mismatched write session identifiers may include simply copying all the subsequent data blocks in the original sequential data set to the copied sequential data set. Alternatively, synchronizing may include comparing a hash value of the of the data block in the original sequential data set with a hash value of the corresponding data block in the copied sequential data set. If the hash value does not match, then the data block from the original sequential data set is copied to the corresponding data block in the copied sequential data set. If the hash value matches, then the copying operation for that corresponding pair of data blocks may be skipped.

4. Replication Example

Figure 3A:
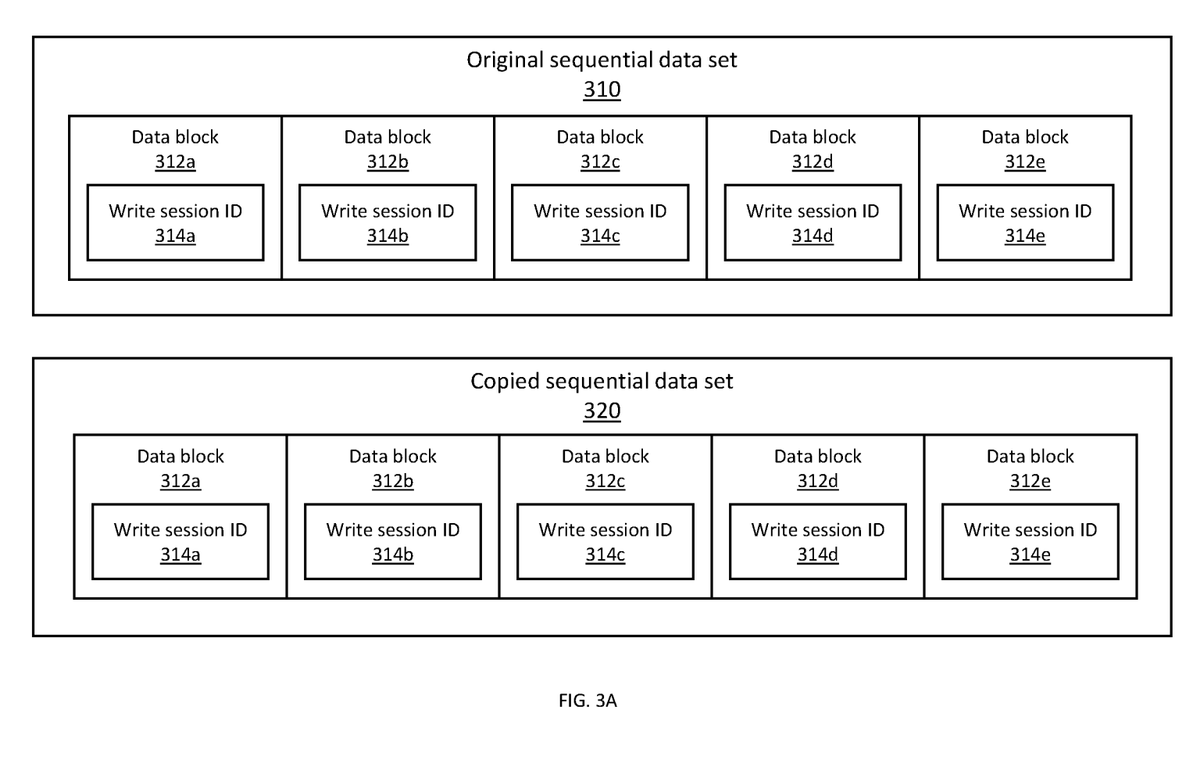
Figure 3B:
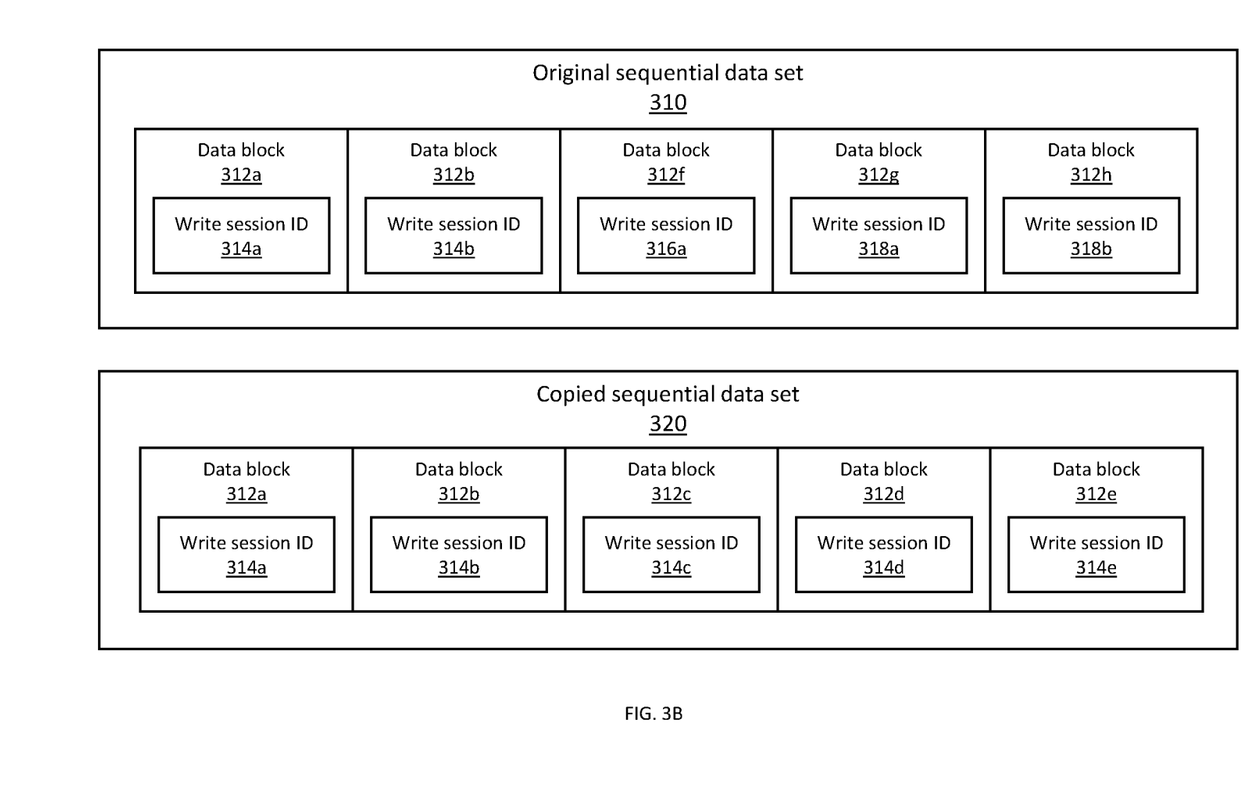
Figure 3C:
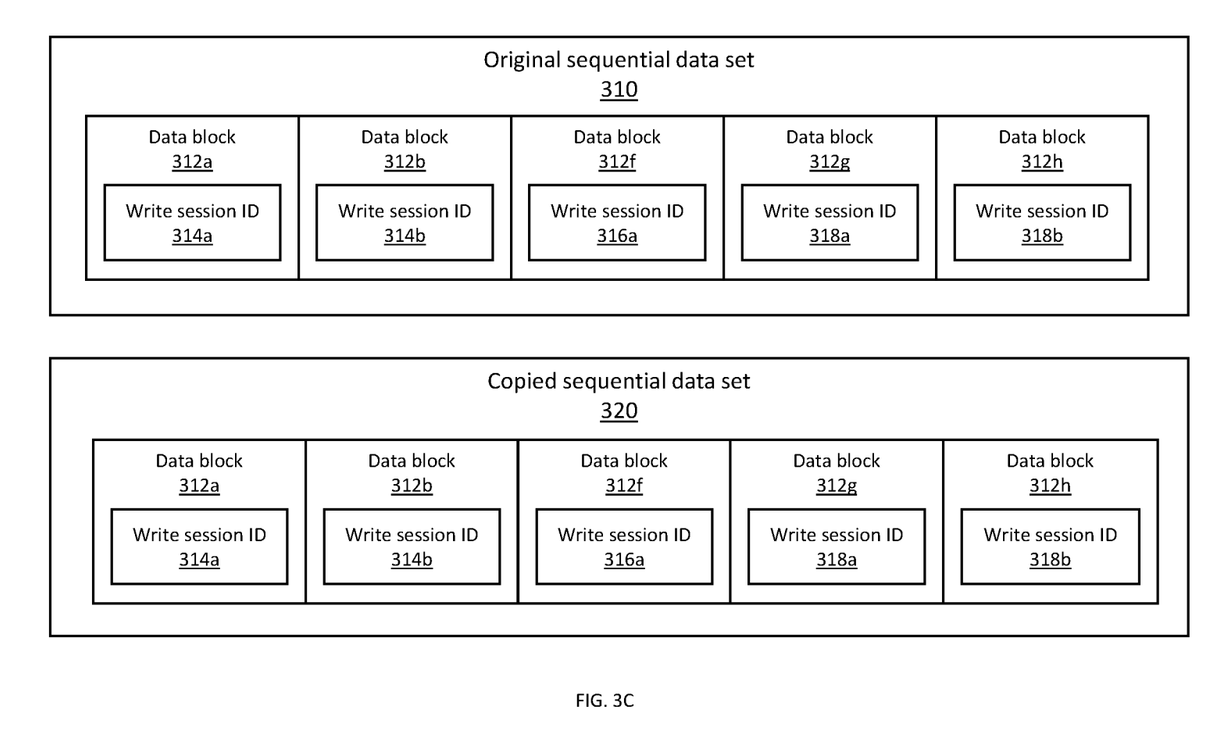

FIG. 3A-FIG. 3C illustrate an example for replicating an original sequential data set into a copied sequential data set, in accordance with one or more embodiments. Some operations recited in this example may be omitted, rearranged, or otherwise modified, and should not be construed as limiting the scope of any of the Claims.

An original sequential data set 310 is modified by at least two write operations. A copied sequential data set 320 is initially the same as the original sequential data set 310. After the original sequential data set 310 is modified, the copied sequential data set 320 is different from the original sequential data set 310. The copied sequential data set 320 is then modified according to processes described herein.

The original sequential data set 310 includes a set of data blocks 312a-312e. Each data block 312a-312e comprises an associated write session identifier 314a-314e. A copied sequential data set 320 is initially the same as the original sequential data set 310. In particular, the copied sequential data set 320 includes a set of data blocks 312a-312e. Each data block 312a-312e comprises an associated write session identifier 314a-314e.

The original sequential data set 310 is modified by at least two write operations. The first two data blocks 312a, 312b remained the same after modification. The data block 312a included associated write session ID 314a, while the data block 312b included associated write session ID 314b. However, data block 312f, data block 312g, and data block 312h are new. The data block 312f comprises associated write session ID 316a. The data block 312g comprises associated write session ID 318a. The data block 312h comprises associated write session ID 318b. After write operation associated with the write session IDs 314a-e, there were at least two subsequent write operations. In another write operation, the write session IDs for data blocks 312f-312h were 316a-316c (not shown). In yet another write operation, the write session IDs for data blocks 312g-312h were 318a-318b.

After the original sequential data set 310 is modified, the copied sequential data set 320 is different from the original sequential data set 310. The copied sequential data set 320 is the same as original sequential data set 310 shown in FIG. 3A.

The write session identifiers of the data sets 310, 320 are compared. The matching engine finds a first data block 312f of original sequential data set 310 where a write session identifier mismatch with data block 312c of the copied sequential data set 320 occurs. Data block 312f corresponds to data block 312c. Each have different write session identifiers. Thus, a mismatch is determined. Data block 312f has associated write session identifier 316a. Data block 312c has associated write session identifier 314c. Data block 312f is the modification point of the original sequential data set 310 as the data block having the associated mismatched write session identifier.

Data of the data block 312f and any data of subsequent data blocks 312g, 312h may be copied to corresponding data blocks 312c, 312d, 312e in the copied sequential data set 320. The copied sequential data set 320 is modified to mirror the original sequential data set 310, as modified. The copied sequential data set 320 is modified without copying data in at least one data block prior to the data block 312f in the original sequential data set 310 to any data block in the copied sequential data set 320.

A data block may be written to a sequential data set as either a copy of another data block or as an original from a write operation. A first read to write transition in a first data set may be set to position 0. The write session identifier may then be set to 1. The write session identifier may be incremented by 1 for each read to write transition. The write session identifier may have a maximum value where the write session identifier is no longer incremented.

When there is no write session identifier associated with a data block, the entire data set must be replicated. Each of the data blocks may then be assigned a write session identifier. The write session identifiers may be initialized to 1 when without a write session identifier or when the data sets are created.

When the write session identifier is set to 0, it is not incremented. In this case, the entire data set must be replicated.

5. Hardware Overview

According to one embodiment, the techniques described herein are implemented by one or more special-purpose computing devices. The special-purpose computing devices are hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices include desktop computer systems, portable computer systems, handheld devices, networking devices or any other device that incorporates hard-wired and/or program logic to implement the techniques.

Figure 4:
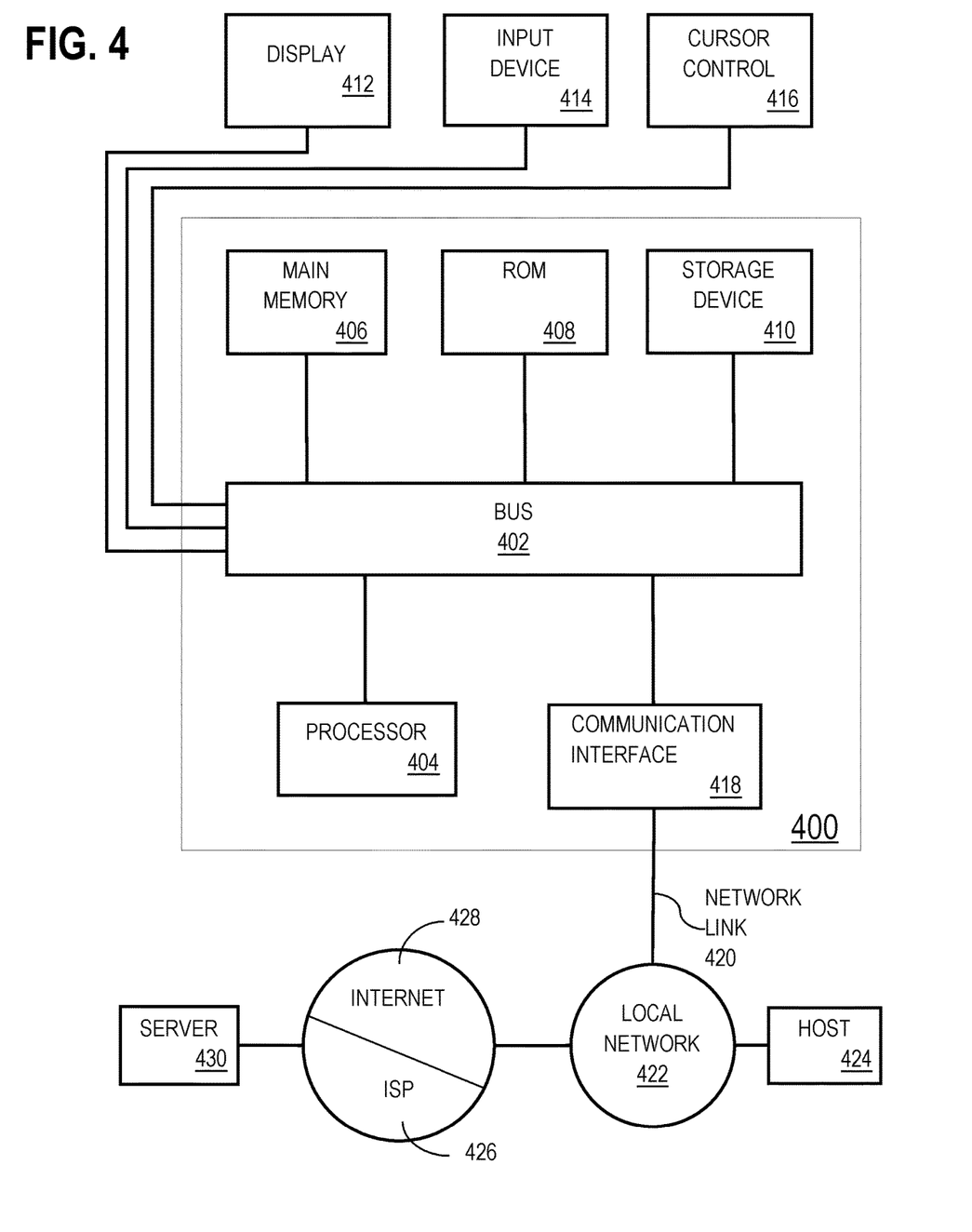
FIG. 4 illustrates an example computer system upon which one or more embodiments may be implemented.

FIG. 4 illustrates an example computer system upon which one or more embodiments may be implemented. Computer system 400 includes bus 402 or other communication mechanism for communicating information, and hardware processor 404 coupled with bus 402 for processing information. Hardware processor 404 is, for example, a general-purpose microprocessor.

Computer system 400 also includes main memory 406, such as a random-access memory (RAM) or other dynamic storage device, coupled to bus 402 for storing information and instructions to be executed by processor 404. In an embodiment, main memory 406 also stores temporary variables or other intermediate information during execution of instructions to be executed by processor 404. Such instructions, when stored in non-transitory storage media accessible to processor 404, render computer system 400 into a special-purpose machine that performs the operations specified in the instructions.

Computer system 400 further includes read only memory (ROM) 408 or other static storage device coupled to bus 402 for storing static information and instructions for processor 404. Storage device 410, such as a magnetic disk or optical disk, couples to bus 402 for storing information and instructions.

Computer system 400 couples via bus 402 to display 412, such as a cathode ray tube (CRT), liquid crystal display (LCD), or light-emitting diode (LED), for displaying information to a computer user. Input device 414, which may include physical and/or touchscreen based alphanumeric keys, couples to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the system 400 performs the techniques herein in response to processor 404 executing one or more sequences of one or more instructions contained in main memory 406. Such instructions are read into main memory 406 from another storage medium, such as storage device 410. Execution of the sequences of instructions contained in main memory 406 causes processor 404 to perform the process steps described herein. In alternative embodiments, the system 400 uses hard-wired circuitry in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

In embodiments, various forms of media carry one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 connected to local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to host computer 424 or to data equipment operated by Internet Service Provider (ISP) 426. ISP 426 in turn provides data communication services through the world-wide packet data communication network, commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, server 430 might transmit a requested code for an application program through Internet 428, ISP 426, local network 422 and communication interface 418.

In one or more embodiments, the processor 404 executes the received code as it is received, and/or stored in storage device 410, or other non-volatile storage for later execution.

6. Miscellaneous; Extensions

Embodiments are directed to a system with one or more devices that include a hardware processor and that are configured to perform any of the operations described herein and/or recited in any of the Claims below.

In an embodiment, a non-transitory computer readable storage medium comprises instructions which, when executed by one or more hardware processors, causes performance of any of the operations described herein and/or recited in any of the Claims.

Any combination of the features and functionalities described herein may be used in accordance with one or more embodiments. In the foregoing specification, embodiments have been described with reference to numerous specific details that may vary from implementation to implementation. The specification and drawings are illustrative rather than regarded in a restrictive sense. The sole and exclusive indicator of the scope of the invention, and what is intended by the applicants to be the scope of the invention, is the literal and equivalent scope of the set of Claims that issue from this application, in the specific form in which such Claims issue, including any subsequent correction.

The invention claimed is:

1. A non-transitory computer readable medium comprising instructions which, when executed by one or more hardware processors, causes performance of operations comprising:
identifying a first sequential data set including a first set of data blocks and a second sequential data set including a second set of data blocks;
comparing write session identifiers of data blocks in the first set of data blocks with write session identifiers of corresponding data blocks in the second set of data blocks, the data blocks of the first set and the second set selected for comparison by applying a binary search algorithm until an initial mismatch is identified and re-applying the binary search algorithm to sequentially prior corresponding data blocks in the first set of data blocks and the second set of data blocks prior to the initial mismatch until identification of a first mismatch, the first mismatch being between a first write session identifier of a particular data block of the first set of data blocks and a second write session identifier in a corresponding data block of the second set of data blocks, wherein the first write session identifier uniquely identifies a first write session operation in which data was written to one or more data blocks in the first set of data blocks, wherein the second write session identifier uniquely identifies a second write session operation in which data was written to one or more data blocks in the second set of data blocks; and based on the first mismatch between the first write session identifier of the particular data block of the first set of data blocks and the second write session identifier in the corresponding data block of the second set of data blocks: (a) copying data in the particular data block of the first set of data blocks to a corresponding data block in the second set of data blocks and (b) copying sequential data in a second subset of data blocks, located subsequent to the particular data block in the first sequential data set, to corresponding sequential data blocks in the second set of data blocks without copying any of a first subset of data blocks located prior to the particular data block in the first sequential data set.

2. The medium of claim 1, wherein the first subset of data blocks comprises at least one data block prior to the particular data block in the first sequential data set.

3. The medium of claim 1, wherein the copying data in a second subset of data blocks, located subsequent to the particular data block comprises copying at least one data block from the particular data block of the first set of data blocks to a last data block of the first set of data blocks to corresponding data blocks in the second sequential data set.

4. The medium of claim 3, wherein the at least one data block from the particular data block to the last data block are copied sequentially in a single direction.

5. The medium of claim 1, wherein the write session identifier of the particular data block comprises a count of read-to-write transitions associated with the first sequential data set.

6. The medium of claim 1, wherein comparing write session identifiers further comprises retrieving, in sequence, a write session identifier associated with a data block in the first set of data blocks, to an exclusion of a full data set of the data block.

7. The medium of claim 1, wherein the second subset of data blocks, located subsequent to the particular data block in the first sequential data set comprises all data blocks from a data block immediately subsequent to the particular data block of the first set of data blocks to a last data block of the first set of data blocks.

8. The medium of claim 7, wherein the sequential data in a second subset of data blocks, located subsequent to the particular data block in the first sequential data set, is copied to corresponding sequential data blocks in the second set of data blocks without comparing write session identifiers, of the second subset of data blocks in the first sequential data set, to corresponding write session identifiers in the second set of data blocks.

9. A method comprising:
identifying a first sequential data set including a first set of data blocks and a second sequential data set including a second set of data blocks;

comparing write session identifiers of data blocks in the first set of data blocks with write session identifiers of corresponding data blocks in the second set of data blocks, the data blocks of the first set and the second set selected for comparison by applying a binary search algorithm until an initial mismatch is identified and re-applying the binary search algorithm to sequentially prior corresponding data blocks in the first set of data blocks and the second set of data blocks prior to the initial mismatch until identification of a first mismatch, the first mismatch being between a first write session identifier of a particular data block of the first set of data blocks and a second write session identifier in a corresponding data block of the second set of data blocks, wherein the first write session identifier uniquely identifies a first write session operation in which data was written to one or more data blocks in the first set of data blocks, wherein the second write session identifier uniquely identifies a second write session operation in which data was written to one or more data blocks in the second set of data blocks; and based on the first mismatch between the first write session identifier of the particular data block of the first set of data blocks and the second write session identifier in the corresponding data block of the second set of data blocks: (a) copying data in the particular data block of the first set of data blocks to a corresponding data block in the second set of data blocks and (b) copying sequential data in a second subset of data blocks, located subsequent to the particular data block in the first sequential data set, to corresponding sequential data blocks in the second set of data blocks without copying any of a first subset of data blocks located prior to the particular data block in the first sequential data set.

10. The method of claim 9, wherein the first subset of data blocks comprises at least one data block prior to the particular data block in the first sequential data set.

11. The method of claim 9, wherein the copying data in a second subset of data blocks, located subsequent to the particular data block comprises copying at least one data block from the particular data block of the first set of data blocks to a last data block of the first set of data blocks to corresponding data blocks in the second sequential data set.

12. The method of claim 11, wherein the at least one data block from the particular data block to the last data block are copied sequentially in a single direction.

13. The method of claim 9, wherein the write session identifier of the particular data block comprises a count of read-to-write transitions associated with the first sequential data set.

14. The method of claim 9, wherein the second subset of data blocks, located subsequent to the particular data block in the first sequential data set comprises all data blocks from a data block immediately subsequent to the particular data block of the first set of data blocks to a last data block of the first set of data blocks.

15. A system comprising:
one or more hardware processors;
one or more non-transitory computer readable media comprising instructions which, when executed by the one or more hardware processors, causes performance of operations comprising:
identifying a first sequential data set including a first set of data blocks and a second sequential data set including a second set of data blocks;

comparing write session identifiers of data blocks in the first set of data blocks with write session identifiers of corresponding data blocks in the second set of data blocks, the data blocks of the first set and the second set selected for comparison by applying a binary search algorithm until an initial mismatch is identified and re-applying the binary search algorithm to sequentially prior corresponding data blocks in the first set of data blocks and the second set of data blocks prior to the initial mismatch until identification of a first mismatch, the first mismatch being between a first write session identifier of a particular data block of the first set of data blocks and a second write session identifier in a corresponding data block of the second set of data blocks, wherein the first write session identifier uniquely identifies a first write session operation in which data was written to one or more data blocks in the first set of data blocks, wherein the second write session identifier uniquely identifies a second write session operation in which data was written to one or more data blocks in the second set of data blocks; and based on the first mismatch between the first write session identifier of the particular data block of the first set of data blocks and the second write session identifier in the corresponding data block of the second set of data blocks: (a) copying data in the particular data block of the first set of data blocks to a corresponding data block in the second set of data blocks and (b) copying sequential data in a second subset of data blocks, located subsequent to the particular data block in the first sequential data set, to corresponding sequential data blocks in the second set of data blocks without copying any of a first subset of data blocks located prior to the particular data block in the first sequential data set.

16. The system of claim 15, wherein the first subset of data blocks comprises at least one data block prior to the particular data block in the first sequential data set.

17. The system of claim 15, wherein the copying data in a second subset of data blocks, located subsequent to the particular data block comprises copying at least one data block from the particular data block of the first set of data blocks to a last data block of the first set of data blocks to corresponding data blocks in the second sequential data set.

18. The system of claim 17, wherein the at least one data block from the particular data block to the last data block are copied sequentially in a single direction.

19. The system of claim 15, wherein the write session identifier of the particular data block comprises a count of read-to-write transitions associated with the first sequential data set.

20. The system of claim 15, wherein comparing write session identifiers further comprises retrieving, in sequence, a write session identifier associated with a data block in the first set of data blocks, to an exclusion of a full data set of the data block.

21. The system of claim 15, wherein the second subset of data blocks, located subsequent to the particular data block in the first sequential data set comprises all data blocks from a data block immediately subsequent to the particular data block of the first set of data blocks to a last data block of the first set of data blocks.

* * * * *